(12) United States Patent
Parker et al.

(10) Patent No.: US 10,452,536 B2
(45) Date of Patent: Oct. 22, 2019

(54) DYNAMIC MANAGEMENT OF GARBAGE COLLECTION AND OVERPROVISIONING FOR HOST STREAM STORAGE

(71) Applicant: Western Digital Technologies, Inc., San Jose, CA (US)

(72) Inventors: Liam Michael Parker, Endinburgh (GB); Sergey Anatolievich Gorobets, Edinburgh (GB); Marc Acosta, Laguna Beach (CA)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/783,739

(22) Filed: Oct. 13, 2017

(65) Prior Publication Data

US 2018/0357159 A1 Dec. 13, 2018

Related U.S. Application Data

(60) Provisional application No. 62/518,503, filed on Jun. 12, 2017.

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/0616* (2013.01); *G06F 3/0631* (2013.01); *G06F 3/0653* (2013.01); *G06F 3/0655* (2013.01); *G06F 3/0688* (2013.01); *G06F 12/0246* (2013.01); *G06F 2212/702* (2013.01); *G06F 2212/7205* (2013.01)

(58) Field of Classification Search
CPC .. G06F 12/0253; G06F 3/0688; G06F 3/0655; G06F 3/0653; G06F 3/061; G06F 3/0616; G06F 3/0631; G06F 12/0246; G06F 12/02; G06F 3/06
USPC ................................. 711/165, 162, 203, 170
See application file for complete search history.

(56) References Cited

U.S. PATENT DOCUMENTS

| | | | |
|---|---|---|---|
| 9,021,231 B2 | 4/2015 | Fitzpatrick et al. | |
| 9,158,670 B1* | 10/2015 | Kang | G06F 12/0246 |
| 10,032,488 B1* | 7/2018 | Kathawala | G11C 7/04 |
| 2012/0011329 A1* | 1/2012 | Nonaka | G06F 3/0604 |
| | | | 711/154 |
| 2013/0061019 A1* | 3/2013 | Fitzpatrick | G06F 11/3485 |
| | | | 711/173 |

(Continued)

OTHER PUBLICATIONS

Jian Huang et al., "FlashBlox: Achieving Both Performance Isolation and Uniform Lifetime for Virtualized SSDs", Feb. 27, 2017 (16 pages).

*Primary Examiner* — Pierre Miche Bataille
(74) *Attorney, Agent, or Firm* — Morgan, Lewis & Bockius LLP

(57) ABSTRACT

A system and method is disclosed for managing data in a non-volatile memory. The system may include a non-volatile memory having multiple non-volatile memory sub-drives. A controller of the memory system is configured receive data streams from multiple different host systems and keep data for the separate streams in separate sub-drives. The method may include dynamically changing overprovisioning of the sub-drives in response to changes in relative workload measurements of data writes coming from the different host systems.

20 Claims, 10 Drawing Sheets

(56) References Cited

U.S. PATENT DOCUMENTS

| | | | |
|---|---|---|---|
| 2013/0104176 A1* | 4/2013 | Rossetti | H04N 5/782 |
| | | | 725/88 |
| 2016/0162205 A1* | 6/2016 | Grimsrud | G06F 3/0616 |
| | | | 711/103 |
| 2016/0179371 A1* | 6/2016 | Sinclair | G06F 3/064 |
| | | | 711/103 |
| 2016/0188226 A1* | 6/2016 | Haines | G06F 12/0246 |
| | | | 711/103 |
| 2017/0242592 A1* | 8/2017 | Camp | G06F 3/0605 |
| 2018/0190329 A1* | 7/2018 | Kathawala | G11C 7/04 |

\* cited by examiner

DYNAMIC MANAGEMENT OF GARBAGE COLLECTION AND OVERPROVISIONING FOR HOST STREAM STORAGE

CROSS-REFERENCE TO RELATED APPLICATIONS

This application claims the benefit of U.S. Provisional App. No. 62/518,503, filed on Jun. 12, 2017, the entirety of which is hereby incorporated herein by reference.

BACKGROUND

Storage systems, such as solid state drives (SSDs) including NAND flash memory, are commonly used in electronic systems ranging from consumer products to enterprise-level computer systems. Cloud providers that use enterprise SSDs often have multiple tenants accessing each SSD simultaneously. A tenant's SSD accesses may be identified by the host protocol which assigns a stream ID, namespace or some other unique identifier to all reads and writes to the drive. Each tenant typically wants the highest performance obtainable whereas the cloud provider needs to be able to reduce costs by improving drive endurance while remaining competitive. This puts the needs of the tenant at odds with those of the cloud provider.

This conflict between the needs of the cloud provider and the tenant may be exacerbated by tenants frequently being active at different times. For example, one tenant might be based in a different time zone than other tenants so the intensity of the workload on a shared SSD will alter depending on the time of the day. Because each tenant has some degree of over-provisioning (OP) associated with their stored data, as soon as their workload drops or becomes inactive the overall OP of the SSD may effectively be reduced thereby restricting overall performance (for example, input/output operations per second, or IOPS) and may also reduce the SSD's endurance. Changes in workload from the different tenants of an SSD may also lead to increased write amplification.

DETAILED DESCRIPTION

Figure 1A:
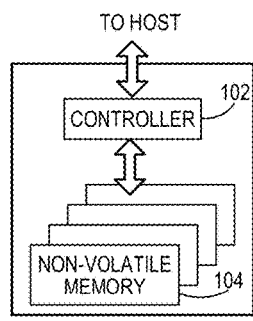
FIG. 1A is a block diagram of an example non-volatile memory system.

In order to address write amplification issues and IOPS performance in a non-volatile memory system storing streams from different tenants, a system and method for dynamic allocation of garbage collection operations and over-provisioning (OP) allocation is described.

As described herein, logically dividing the shared non-volatile memory (NVM) of a NVM system into sub-drives, and rearranging the OP of the sub-drives based on a current workload, may provide more flexible and desired performance benefits as compared to simply assigning a fixed amount of physical space in a NVM system to different tenants. Instead assigning a predetermined fixed amount of physical or logical space for each different tenant (host source) sharing the non-volatile memory system, a system and method for managing different data streams separately, but flexibly adjusting an amount of OP for each tenant based on the changing workloads of all of the tenants is provided. The flexible management of the separate data streams from the tenants may include maintaining physical separation of tenants' data on a superblock level and dynamic OP management based on workload. The dynamic OP management may include changing OP to minimize SSD level write amplification based on a workload analysis. In different implementations, OP management may include modification of OP according to host hints or specific tenant mandated targets. In some aspects, the OP may be changed dependent on previous history of tenant activity so as to improve transition behavior. Also, a free block pool shared by all of the sub-drives in the NVM system may facilitate improved wear leveling.

According to one aspect, a method for managing data in a memory system having a controller in communication with a plurality of non-volatile memory sub-drives is described. The method includes receiving host data writes of a plurality of data streams from a plurality of host sources at the memory system. For each of the plurality of data streams the controller stores received host writes only in a respective sub-drive of the plurality of sub-drives associated with the particular data stream. The method includes measuring a host write workload of each of the plurality of sub-drives and then altering an amount of overprovisioning of one of the plurality of sub-drives in response to a change in the measured workload of other of the plurality of sub-drives.

In different implementations, altering the amount of over-provisioning of the one of the plurality of sub-drives may include selecting a source superblock from the one of the plurality of sub-drives, relocating valid data from the selected source block only into a relocation superblock in the one of the plurality of sub-drives, and assigning the source block to a shared free block pool for the non-volatile memory system after relocating the valid data.

According to another aspect, a non-volatile memory system for managing data from a plurality of hosts is disclosed. The system may include a non-volatile memory having a plurality of non-volatile memory sub-drives and a controller in communication with the plurality of sub-drives. The controller may be configured to receive host data writes of a plurality of data streams from the plurality of hosts and maintain data from each of the plurality of data streams in a different respective separate sub-drive. The controller may also be configured to measure a host write workload of each of the plurality of sub-drives and determine a respective target overprovisioning level for each of the plurality of sub-drives based on a relative workload from each of the plurality of hosts. The controller may also be configured to adjust an overprovisioning of one of the plurality of sub-drives in accordance with the determined respective target overprovisioning level for the one of the plurality of sub-drives.

Referring now to FIG. 1A, a block diagram illustrating a non-volatile memory (NVM) system is shown. The NVM system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is fully programmed, moving only the valid pages of data to a new block, so the fully programmed block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
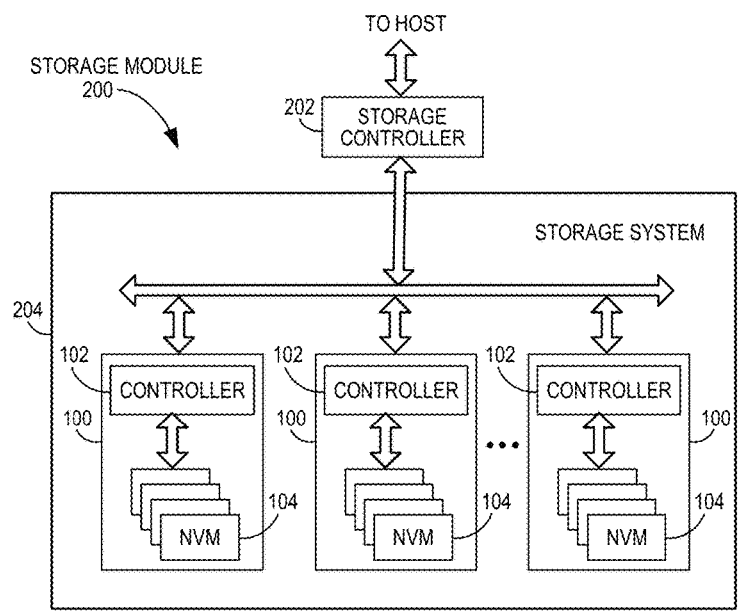
FIG. 1B is a block diagram illustrating an exemplary storage module.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
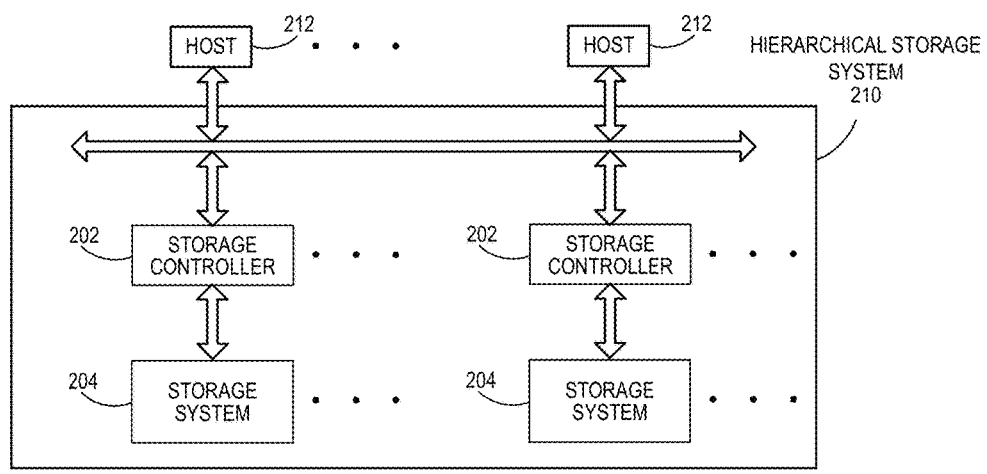
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
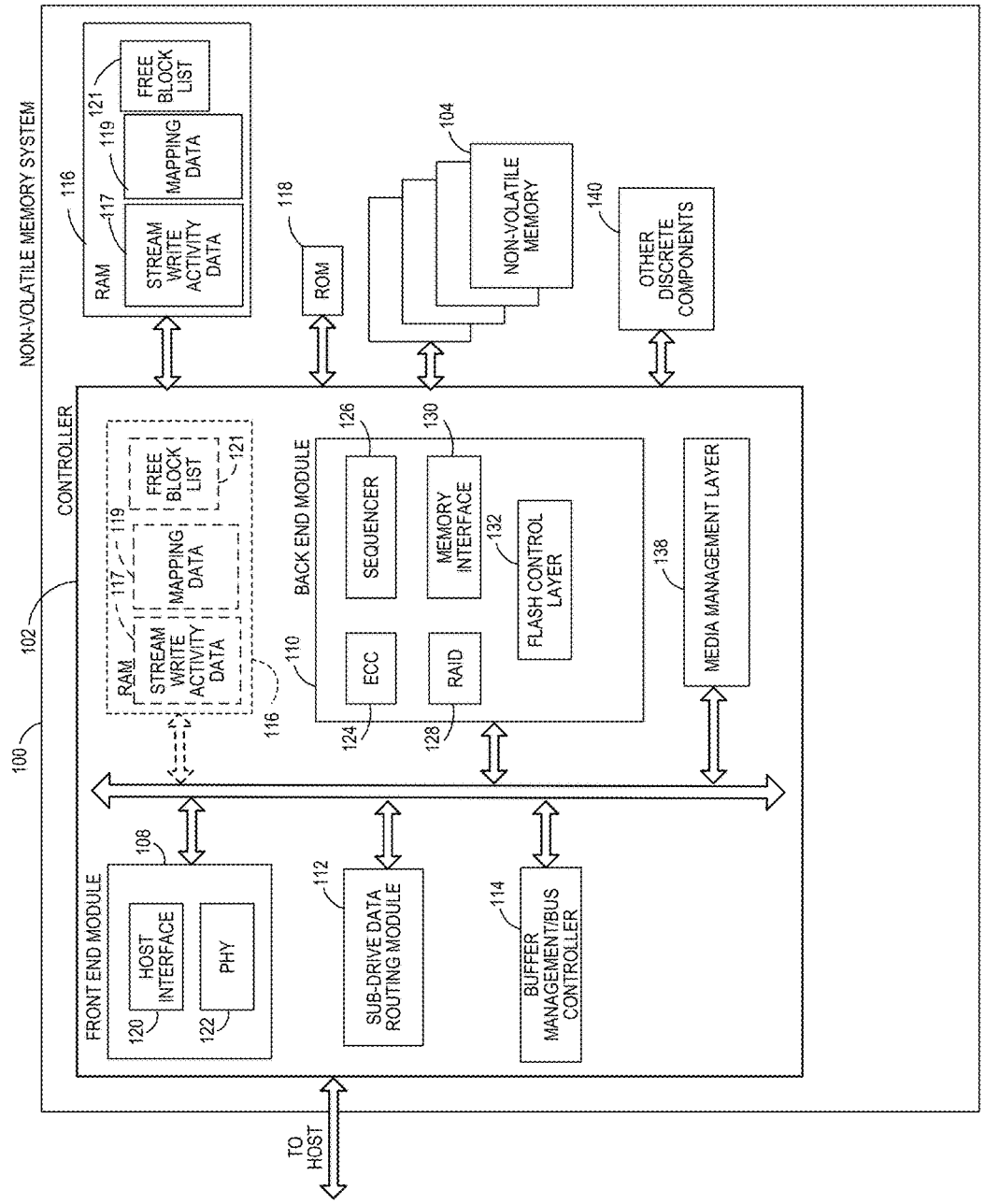
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a sub-drive data routing module 112 present on the die of the controller 102. As described below, the sub-drive data routing module 112 may provide functionality for routing data for different data streams to a particular sub-drive of the non-volatile memory 104 and for dynamically changing the OP of sub-drives in the non-volatile memory 104 based on a current workload. The sub-drive data routing module 112 of the controller 102 may accomplish this by, when a garbage collection operation is needed, determining an ideal amount of OP for each sub-drive based on relative workload of each sub-drive and current OP of each sub-drive. The sub-drive data routing module may then select a superblock for garbage collection from the sub-drive having the greatest amount of OP above its calculated ideal OP. Because each sub-drive may be assigned to a particular data stream from a different tenant, data moved in a garbage collection operation is only moved within a same sub-drive and there is no sorting or movement of data between sub-drives.

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may contain stream write activity data 117 that is used to track the recent workload the various sub-drives, as well as mapping table data 119 identifying valid and obsolete data in each sub-drive of the non-volatile memory 104. The stream write activity data may be in the form of the number of superblocks or pages of writes to each sub-drive. The RAM 116 may also include a free block list 121 indicating currently unused physical superblocks available for use in any of the sub-drives of the non-volatile memory 104.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
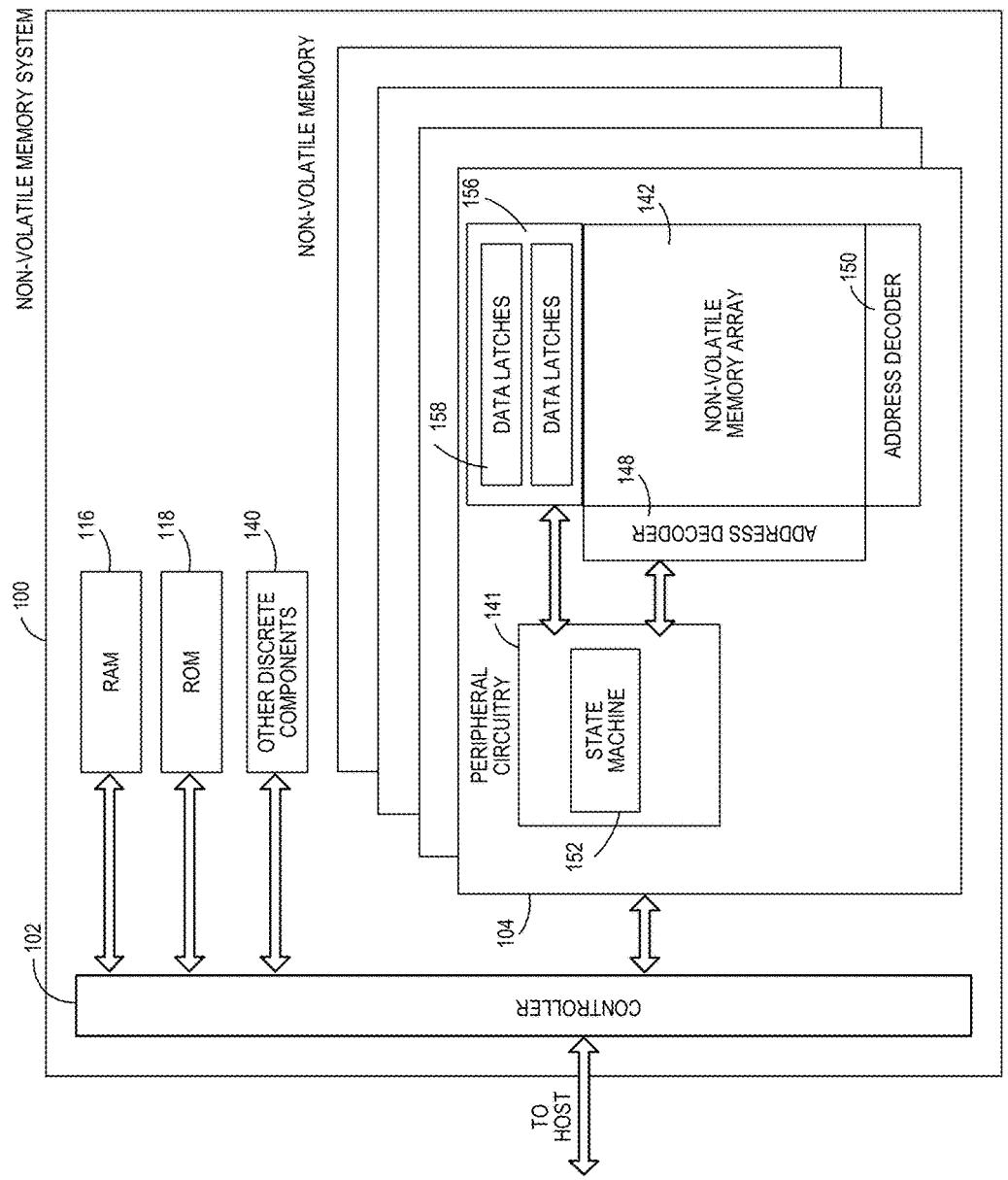
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
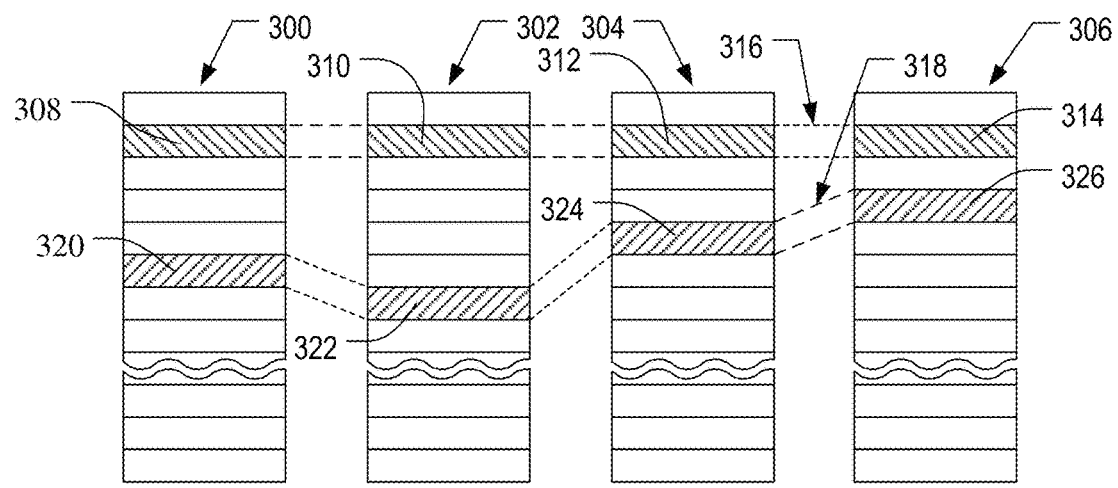
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
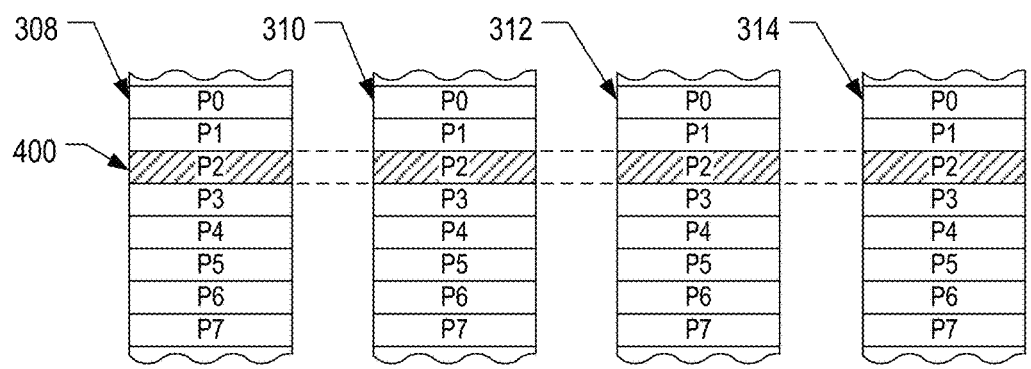
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
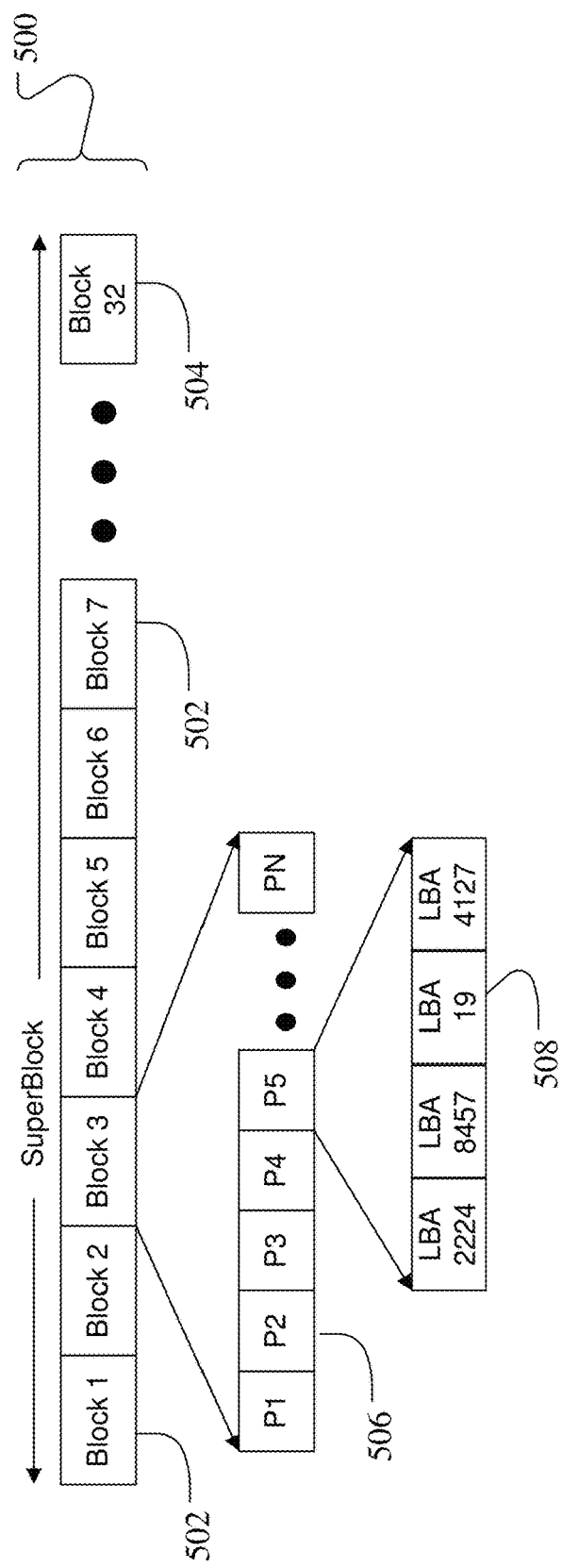
FIG. 5 illustrates is an example of a physical superblock of the non-volatile memory.

The term superblock may be used interchangeably with the term metablock herein. A superblock, as described in more detail below with reference to FIG. 5, is a metablock that assigns one of the constituent blocks to contain exclusively metadata regarding parity information for all of the remaining constituent blocks of the metablock. For example, each page of the designated parity block of a superblock may contain exclusive (XOR) data of the user data in a page of the remaining blocks of the superblock. The block in the superblock designated to contain parity data is typically the last block, but any block may be used in other implementations. Additionally, a superblock may span multiple dies, for example as many as 64 dies or higher.

Referring to FIG. 5, an example of a superblock 500 and its component parts is shown. As noted previously, a superblock 500 may be a fixed number of physical blocks 502 of data as well as one block 504 that contains exclusive or (XOR) data for every page of every other block 502 in the superblock 500. Each block 502 is comprised of a plurality of pages 506 that includes a plurality of pieces 508 of data. Each data piece 508 is an amount of data, for example a 4 Kbytes piece of data, that is associated with a logical block address (LBA). The LBAs shown in the example data pieces 508 of FIG. 5 are simply provided by way of example to show a situation where the data pieces 508 in a page 506 are associated with discontinuous LBAs. Although the superblock 500 increment of data is shown and may be the measure of data used for data movement in the examples provided, different data sizes are contemplated as well.

Figure 6:
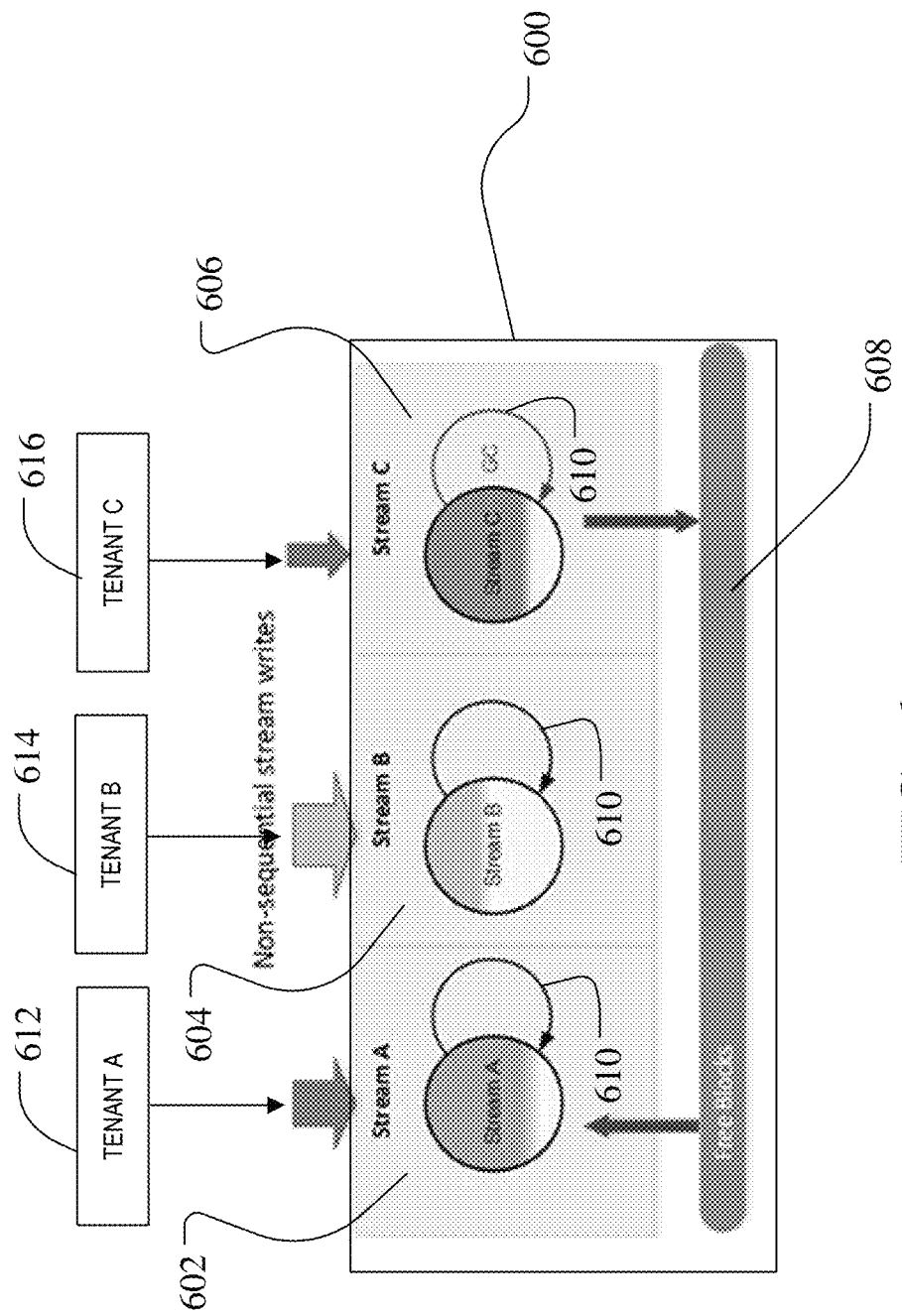
FIG. 6 illustrates a block diagram of the non-volatile memory of FIG. 2A divided into multiple sub-drives assigned exclusively to data streams from respective different tenant sources.

In FIG. 6, a conceptual illustration of a sub-drive arrangement of the non-volatile memory 600 (corresponding to non-volatile memory 104 in FIGS. 2A-2B) is shown. The non-volatile memory 600 is divided into sub-drives for storing data, including sub-drives 602, 604, 606. As noted above, in one implementation it is contemplated that the non-volatile memory 600 is part of a NVM system 100 shared by multiple tenants such as in a cloud storage arrangement. Each tenant 612, 614, 616 may be considered a host system of a different remotely located subscriber to memory services of the NVM system 100, where a host device for each tenant 612, 614, 616 may send a respective data stream for storage on the NVM system 100. Each data stream is separately identifiable for each tenant, for example based on unique header identification information that may accompany all stream writes from a tenant, and the sub-drive data routing module 112 of the NVM system may be configured to identify each different data stream based on identifier information provided in or with the different streams.

Although, for simplicity of illustration, the tenants in FIG. 6 are depicted as directly writing into the various respective sub-drives 602, 604, 606, the sub-drive data routing module 112 and controller 102 actually manage the sorting and writing of the data. The sub-drive data routing module 112 of the controller 102 is configured to permit only a single tenant's data in a given sub-drive 602, 604, 606, such that each tenant's data is always kept separately from other tenant data in a respective one of the sub-drives. The identifier information may be based on host protocol information associated with the data stream. The sub-drive data routing module 112 may use a data stream identifier provided by the host of the particular tenant 612, 614, 616 to differentiate data belonging to each stream and write that data to the exclusive one of the sub-drives associated with that data stream.

The controller 102 may keep the stream data (Stream A, Stream B, Stream C in the example of FIG. 6) from each tenant source physically separated on a superblock 500 level. In one implementation, to assist with wear levelling, the controller is configured to maintain a shared superblock pool 608 that receives superblocks freed in garbage collection operations. The free block list 121 maintained in RAM 116 may keep track of the current free blocks in the NVM system 100. Garbage collection 610, the process of reclaiming space occupied by obsolete data in a previously programmed superblock 500 by copying the valid data in that superblock and writing the valid data back to a new superblock so that the previously programmed block may be recycled, is restricted to moving data within a sub-drive 602, 604, 606. Thus, when a garbage collection operation is necessary, the valid data from the selected superblock is only written to a superblock assigned to the same sub-drive in one implementation. In the example of FIG. 6, if a superblock 500 is selected for garbage collection 610 in the sub-drive 606 containing Stream C data, then the valid data may only be copied into a relocation superblock associated with that same sub-drive 606. No mixing of data is permitted between sub-drives. Although the sub-drives 602, 604, 606 draw free superblocks from the same free block pool 608, every tenant's data (e.g., data stream) is written to a separate open update superblock 500 and every closed superblock is then attributed exclusively to only that tenant in a separate sub-drive.

When the common pool of free blocks drops below a predetermined threshold, a garbage collection operation is triggered to replenish the free block pool. The free block threshold may be, for example, a percentage of the total superblocks in the non-volatile memory 104 or a particular number of free superblocks. Also, the free block threshold may be a fixed or a dynamically determined amount. In order to decide on the sub-drive from which to select a superblock for garbage collection, an optimal overprovisioning amount for each sub-drive is calculated. In order to provide a dynamic allocation of OP to the sub-drives, a current workload is calculated, and the relative workload of each data stream is determined based on that calculated workload, as well as the current overprovisioning of each sub-drive (i.e. of each data stream).

Any of a number of target overprovisioning formulas and techniques may be used to determine target overprovisioning for each sub-drive.

One suitable algorithm may be:

$$\theta_i = \sqrt{\frac{\alpha_i \cdot v_i}{\left(\sum_i \sqrt{\alpha_i \cdot v_i}\right)^2}}$$

where $\theta_i$ is the fraction (0 to 1) of target OP that should be applied to sub-drive i; $\alpha_i$ is the fraction (0 to 1) of total NVM system valid logical space in sub-drive i; and $v_i$ is the fraction (0 to 1) of total host write workload attributed to sub-drive i. In the example of FIG. 6, the number of sub-drives is 3 and so i=3. Any of a number of different approaches and formulas for determining the target OP may be used. Additional details on known forms of target OP calculations may be found in, for example, U.S. Pat. No. 9,021,231, the entirety of which is hereby incorporated herein by reference. Other cruder, trial and error over-provisioning calculation methods are also contemplated where a write amplification calculation, such as a write-amplification surface (graphical generation of write amplification levels for a range of over-provisioning options for the multiple sub-drives) generated from any of a number of know write amplification calculation techniques, may be used to iteratively try different over-provisioning solutions for each sub-drive to approach or reach a minimum charted write amplification on the write amplification surface for the NVM system as a whole.

With respect to the algorithm for target OP above, the fraction of the total host write workload, $v_i$, may be calculated as the percentage of host writes to each sub-drive 602, 604, 606 in the non-volatile memory 104 of the total amount of host data writes written to the non-volatile memory 104. Although this may be a cumulative calculation from the beginning of operation of the NVM system 100, a more dynamic calculation that can better respond to recent changes in write densities to the different sub-drives uses a smaller window of time in which to calculate relative host write workload.

In one implementation, the controller 102, via the sub-drive data routing module 112, keeps track of all host write transactions. The host write transactions may be tracked at any of a number of different levels of granularity, for example by page or by superblock. The sub-drive data routing module 112 also tracks which sub-drive these host data writes are directed to based on stream identifier information arriving with the data. The window of time over which a host write workload is tracked may be a fixed window of time that extends back a limited amount of time to the present, where host write activity prior to the window is ignored in determining current workload.

Figure 7A:
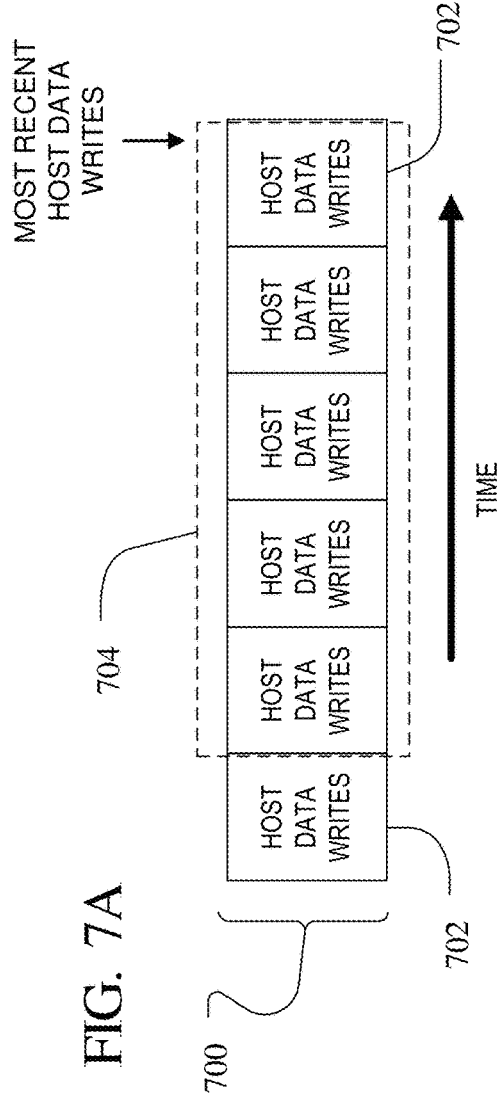
FIGS. 7A and 7B illustrate a monitoring window of most recently received host data that is used to determine current temperature of logical addresses in the non-volatile memory system.
Figure 7B:
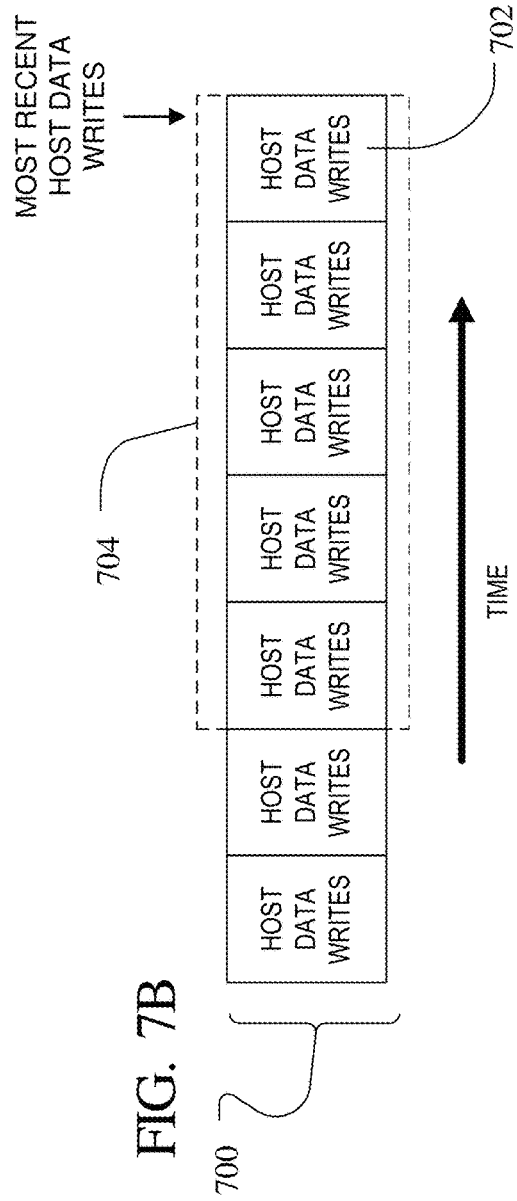

A visual representation of this sliding window of time within which the host write activity at LBAs is shown in FIGS. 7A and 7B. In FIG. 7A, the incoming host data stream 700 is represented as predetermined amounts of host data, shown as host data writes 702, that are accumulated over time. The host data write size may be a fixed and constant amount in one implementation, for example the host data write size may be in the increment of a superblock 500. The controller 102 may look only at the hit rate of host data writes to each sub-drive in a sliding window 704 of time, where the time may be represented by the number of consecutive host data writes 702 from the most recent to a predetermined number of host data writes prior in time. Within this window 704, all of the host transactions for each data stream are tallied, and a percentage workload of the amount of data directed to each sub-drive in the time window 704 may be determined.

As shown in FIG. 7B, when a next host data write 702 has been accumulated, the window 704 slides to include the latest host data write 702 and the oldest host data write 702 previously in the window is removed, representing that the LBA transaction counts associated with that now excluded host data write 802 are not included in the respective workload calculation. In this manner, the current workload of stream writes in the various sub-drives may more accurately be reflected and older activity is removed. The above technique and system for tracking and updating (host write activity) for LBA streams is just one example and other write density and sub-drive workload tracking and update methods are contemplated.

In one implementation, when the NVM system becomes idle or the system is powered down, the current workload calculations may be stored so that, upon power up or resumption of activity, the NVM system may adapt quickly to resumed tenant activity. For example, if an individual tenant goes idle for some predetermined time period, the accuracy of resuming workload calculations may be improved by storing the pre-idle workload information for that tenant. The idle status of a sub-drive may be set at a predetermined amount of time since a last write from the particular tenant for that sub-drive. Otherwise, as time passes, the window 704 for calculating write density for that sub-drive will include inactive time periods that may skew the workload determination for the sub-drive when that particular tenant starts writing data again to the sub-drive. It is contemplated that a workload upon restart after an idle period may likely be close to the workload prior to the tenant and associated sub-drive becoming idle.

Once the workload portion and the current portion of total NVM system valid logical space is determined by the sub-drive data routing module 112 of the controller 102, the target OP for each sub-drive may be determined. Selection of a sub-drive for a garbage collection operation may then be made based on which sub-drive has a current actual OP that is the most above its calculated target OP. Current actual OP may be determined for each sub-drive by the controller by comparing the amount of valid data in a sub-drive to the total physical space currently allotted to that sub-drive.

Figure 8:
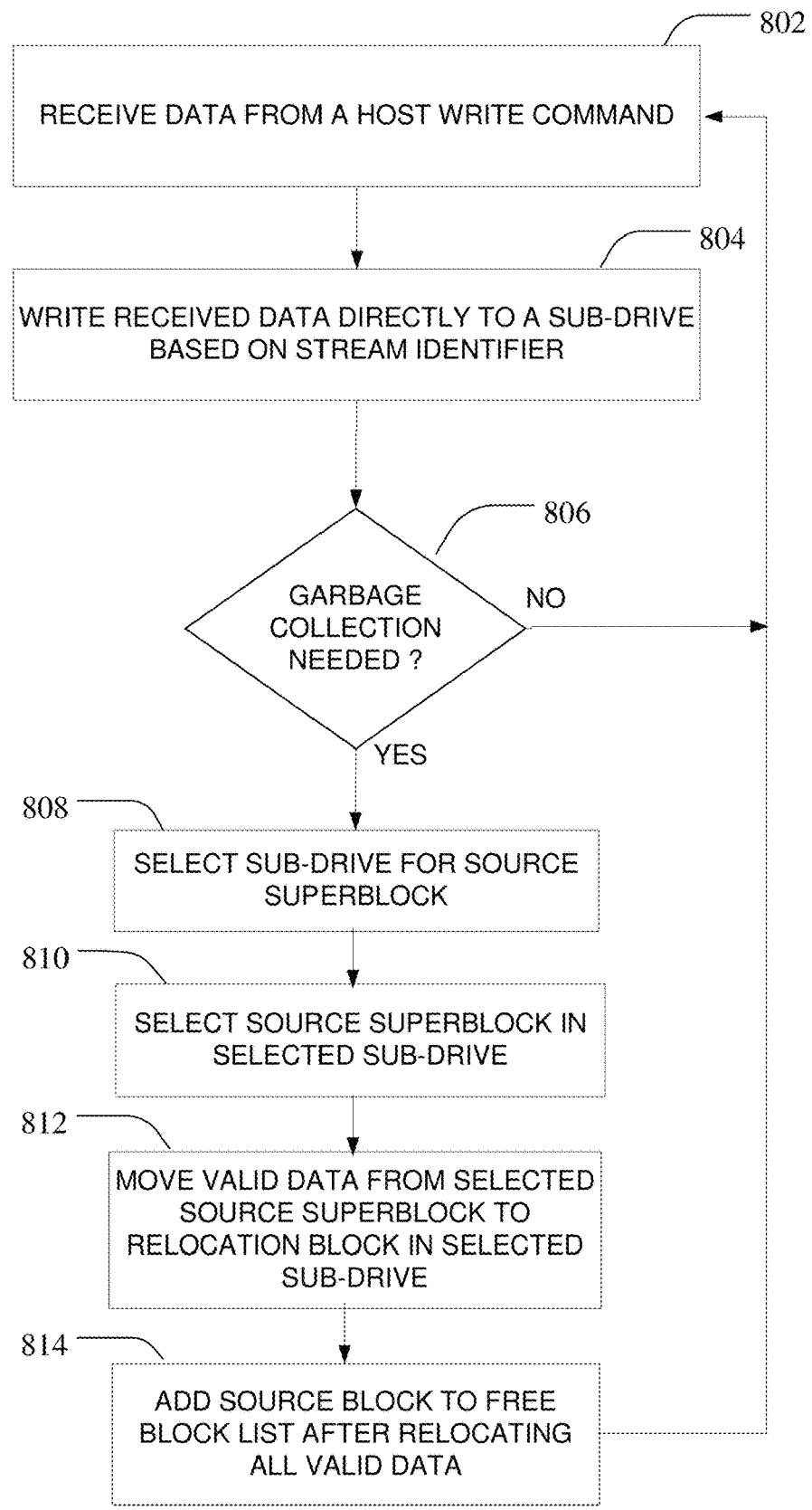
FIG. 8 is a flow diagram illustrating one implementation of managing data flow in a non-volatile memory such as shown in FIG. 6.

A method of utilizing the NVM system 100 with sub-drives and data structures described above is illustrated in FIG. 8. Referring to FIG. 8, a flow chart describing an implementation of the data flow in sub-drives 604, 606, 608 the non-volatile memory 600 is described. Data is received at the NVM system 100 associated with a host write command (at 802). The sub-drive data routing module 112 of the controller 102 may use data stream identifiers in or associated with the host data write commands to initially direct the host write to a desired sub-drive associated with that data stream (at 804).

Periodically, for example after every host write to the NVM system 100, the controller 102 may determine whether a garbage collection operation is needed for any of the sub-drives (at 806). One suitable garbage collection trigger may be the number of free blocks in the free block pool 608 shared by the sub-drives in the non-volatile memory 104 falling below a predetermined minimum value. If the controller 102 detects that too few free blocks are available based on the free block list 121, then a garbage collection operation may be initiated. The number of free blocks is just one example of a garbage collection trigger and different or additional garbage collection triggers are contemplated.

Once triggered, the sub-drive in the non-volatile memory 104 is selected from which a source superblock will be garbage collected (at 808). One sub-drive selection process, based on selecting the sub-drive that currently has an amount of over-provisioning (OP) that is the most over its calculated targeted OP amount, is described above. Once the sub-drive is selected, a source superblock is selected from that sub-drive (810), for example the superblock 500 having the least amount of valid data. Valid data from the selected source superblock is then copied to a destination (relocation) superblock in the same sub-drive (at 812). As noted previously, the valid data copied from a source superblock is only copied into another superblock in the same sub-drive and no data crosses sub-drive boundaries during garbage collection. After all valid data pieces from the selected source superblock 500 have been relocated, then the selected source superblock may be added to the free block list 121 maintained in RAM 116 (at 814). Superblocks 500 in the free block list 121 may be later used in any of the sub-drives as needed.

Referring again to the garbage collection decision path of FIG. 8, and the step of selecting a sub-drive from which to garbage collect a superblock, the decision as to which particular sub-drive 602, 604, 606 requires a garbage collection operation may be based on target over-provisioning thresholds for each of the different sub-drives. Overprovisioning, as used herein, refers to the amount of physical space in non-volatile memory greater than the amount of logical address space. The total amount of overprovisioning for the entire non-volatile memory 104 may be preset at manufacture and, based on current tenant (host) activity, such as write activity, may be distributed among the sub-drives as respective target overprovisioning thresholds.

The target overprovisioning thresholds for each sub-drive in the non-volatile memory 104, as described in greater detail above, are determined based on the current logical capacity occupied by valid data in each sub-drive and the current write traffic (also referred to herein as workload) in each sub-drive. The NVM system 100, through these variable target overprovisioning settings, can take into account changing data stream activity and help avoid write amplification in sub-drives that have more active data streams. For example, the NVM system 100 may be configured at manufacture to include a predetermined amount of minimum physical capacity overprovisioning for the system as a whole and, because the logical and physical space demands may change based on changing tenant usage (as measured by timing and amount of data stream writes for each tenant), flexibility and dynamically assigning a larger amount of overprovisioning to different sub-drives may help avoid write amplification.

Figure 9A:
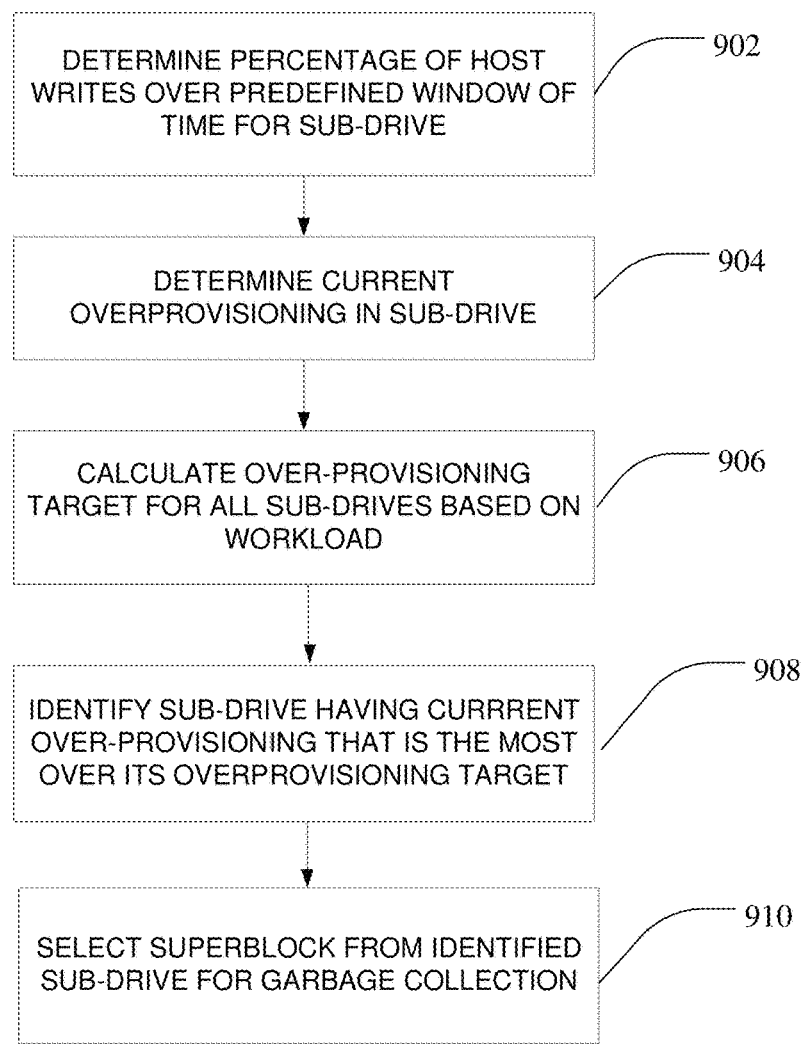
FIGS. 9A and 9B are flow diagrams for different methods of selecting a sub-drive and superblock for garbage collection in the method of FIG. 8

Referring now to FIG. 9A, one process for selecting a source superblock for a garbage collection operation in the process of FIG. 8 is shown. As described above, the target OP for the respective sub-drives is used to determine the appropriate sub-drive. The current workload for each sub-drive is calculated over the predefined window 704 by the controller 102 (at 902). The sub-drive data routing module 112 may then determine the actual amount of overprovisioning already present in each sub-drive (at 904), for example by looking at the amount of physical space already associated with each sub-drive relative to the amount of valid data present in the sub-drive. A target over-provisioning desired for each sub-drive may be calculated based on the determined workload in each sub-drive (at 906). Once the target overprovisioning is calculated from the workload, the sub-drive data routing module 112 may then identify the sub-drive having a current over-provisioning level that is the greatest amount over its calculated target OP level (at 908). A superblock is then selected from that identified sub-drive for garbage collection (at 910).

The criteria for superblock selection within the selected sub-drive may be any of a number of criteria, such as the superblock with the least amount of valid data, the most recently written superblock, or other criteria. As noted above, the non-volatile memory 104 of the NVM system 100, as a whole, may be manufactured with an overprovisioning amount such that there is a predetermined extra physical capacity (e.g. extra physical superblocks) greater than the predetermined total logical capacity.

In one alternative implementation, in some instances the selection of a sub-drive 602, 604, 606 for garbage collection may be altered from the pure calculation of relative target OP described above. For instance, in a cloud storage situation a tenant may require that its data stream (e.g. one of Data Stream A, B or C of FIG. 6) receive a guaranteed amount of overprovisioning that differs from the optimized target OP calculation. In order to accommodate one or more tenants with such a fixed minimum, the process of FIG. 9A may be modified to allow the NVM system 100 to override the idealized target OP comparisons that are intended to minimize write amplification.

Figure 9B:
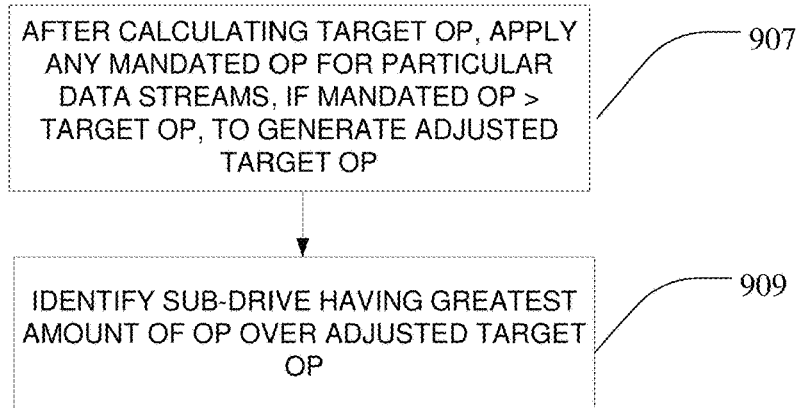

Referring to FIGS. 9A and 9B, the process of FIG. 9A may be modified to replace step 908 with steps 907 and 909 of FIG. 9B. Specifically, instead of ending the inquiry as to which sub-drive to select for a garbage collection operation based on the calculated target OP, the sub-drive data routing module 112 will check to see if a tenant has mandated a minimum OP and, if the mandated minimum OP is greater than the calculated target OP, the sub-drive data routing module will substitute the mandated OP for the target OP, thus creating an adjusted target OP (at 907). The adjusted target OP will then be substituted for the target OP and the relative amounts of actual over-provisioning of each sub-drive will be compare based on the adjusted target OP for any sub-drives having an adjusted target OP and the target OP for sub-drives not having an adjusted target OP requirement. The sub-drive having the greatest amount of OP above its target OP (or adjusted target OP) will be selected for the garbage collection operation. Accordingly, if a sub-drive has a higher adjusted target OP than its target OP, it will reduce the chance that sub-drive will have the greatest amount of actual over provisioning by using the higher adjusted target OP.

Figure 10:
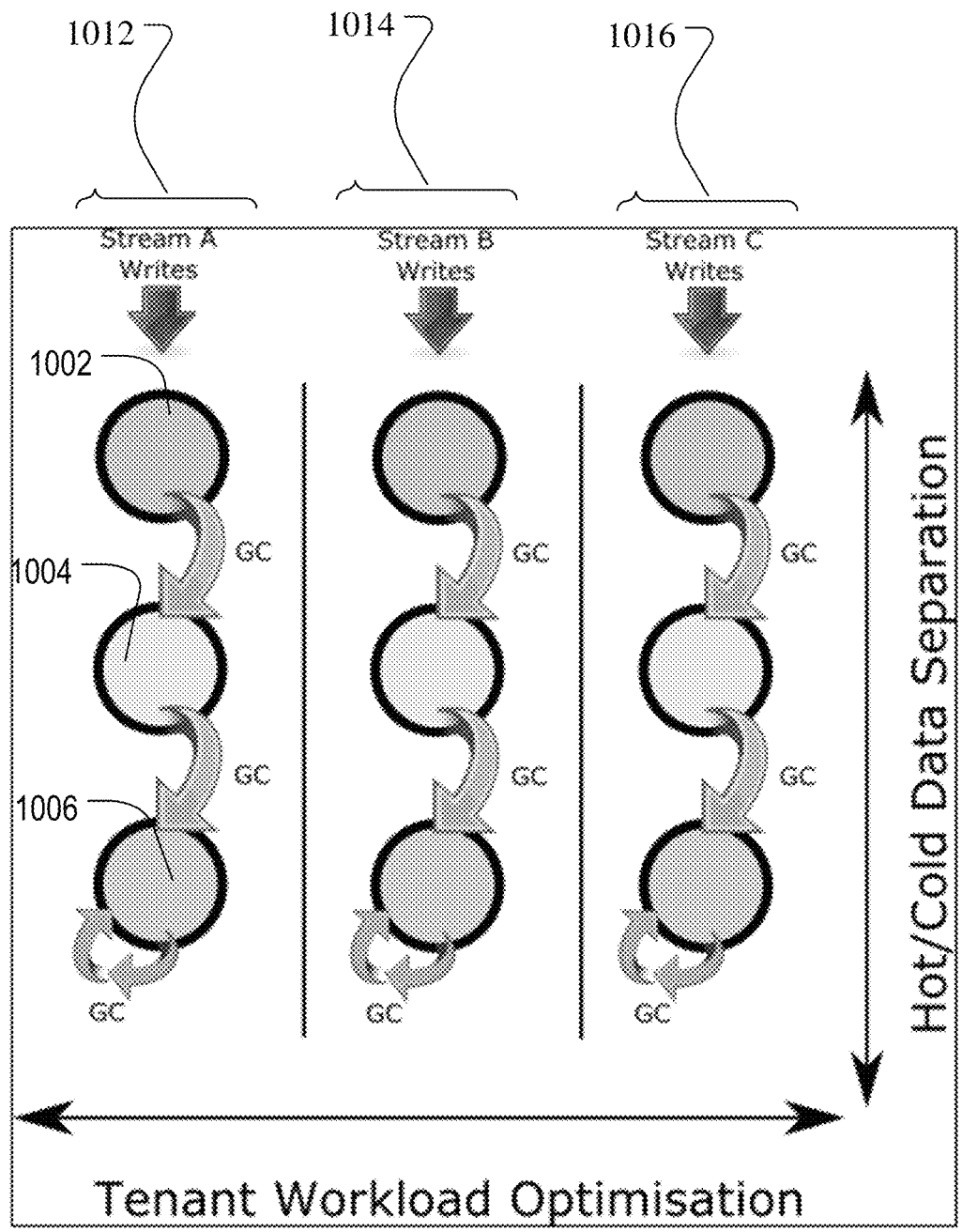
FIG. 10 is an alternative embodiment of a sub-drive arrangement of FIG. 6 for separately managing data from different tenants using the non-volatile memory system.

In other implementations, the isolation of different streams from different tenants into separately garbage collected and dynamically over-provisioned sub-drives may also be combined with data temperature differentiation for each data stream. Referring to FIG. 10, a version of the non-volatile memory of FIG. 6 where each data stream includes temperature differentiated data is shown. Each tenant (a separate host source system represented by a respective one of data Stream A, B or C in FIG. 10) is assigned its own tenant work space 1012, 1014, 1016, and each tenant work space may consist of multiple different data temperature differentiated hot 1002, medium 1004, and cold 1006 sub-drives exclusively associated with those tenant work spaces 1012, 1014, 1016. Other numbers of tenant work spaces and different numbers of sub-drives associated with the tenant work spaces are contemplated in other embodiments.

In the embodiment of FIG. 10, the same principle of permitting data from only one tenant into a particular sub-drive is extended to only permitting data from only one tenant into the collection of sub-drives 1002, 1004, 1006 that make up that particular tenant's work space. Here, garbage collection operations 1008 are only permitted by the sub-drive data routing module between sub-drives, or in a same sub-drive, within a specific tenant work space. In other words, valid data in the garbage collection operation stays within the tenant work space that it originates from and the data streams are kept separate.

The hot/cold temperature sorting between sub-drives in a tenant work space 1012, 1014, 1016 may be accomplished in any of a number of ways. For example, all incoming host writes for a particular data stream may be initially routed to the hot sub-drive 1002 for that tenant work space and any garbage collection in that sub-drive results in the valid data moving to the next colder sub-drive (here, the medium sub-drive 1004). Similarly, garbage collection of a superblock 500 in the medium sub-drive 1004 would lead to the valid data being moved to the cold sub-drive 1006, where garbage collection of the data from a cold sub-drive 1006 would leave the valid data in the cold sub-drive 1006. The garbage collection trigger may be a drop in free blocks from the common fee block pool as described previously. Selection of a tenant work space 1012, 1014, 1016 from which a source superblock is to be selected may be based on the same principle of relative amount of overprovisioning in a tenant work space to a target overprovisioning for the tenant work space, and selection of a superblock within that identified tenant work space based on a superblock there having a least amount of valid data. Other mechanisms for determining temperature sorting within sub-drives in a tenant work space are also contemplated.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for managing received data of data streams from multiple different host sources, also referred to as tenants, at a shared NVM system. The NVM system may adjust performance, for example in the form of overprovisioning amount, provided to one tenant to take into account a workload from the other tenants. The over-provisioning may be shared and dynamically changed in response to the changing workloads of the multiple tenants. Data may be separated on a superblock basis and managed in separate sub-drives so that data streams from the different tenants do not co-mingle or overlap in a sub-drive during garbage collection. By using a target overprovisioning calculation based on minimizing a write amplification, an optimal amount of over-provisioning may be determined for each sub-drive and enabled through selection of a superblock for garbage collection from a sub-drive that is the most over its currently calculated target over-provisioning level.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for managing data in a non-volatile memory system having a controller in communication with a plurality of sub-drives, the method comprising the controller:

receiving host data writes of a plurality of data streams from a plurality of host sources at the memory system, wherein each of the plurality of data streams is associated with a respective tenant, each respective tenant corresponding to a host system of a different remotely located subscriber, wherein each tenant is associated with a minimum amount of overprovisioning;

for each of the plurality of data streams associated with the respective tenant, storing all received host writes associated with the respective tenant only in a respective one sub-drive of the plurality of sub-drives, the respective one sub-drive being only utilized for the respective tenant, wherein each of the plurality of data streams is separately identifiable based at least in part on identification information that is included with each stream write from the respective tenant;

measuring a host write workload of each of the plurality of sub-drives; and altering an amount of overprovisioning of one of the plurality of sub-drives based on the minimum amount of overprovisioning associated with the respective tenant of the sub-drive and a change in the measured host write workload of another of the plurality of sub-drives.

2. The method of claim 1, wherein altering the amount of overprovisioning of the one of the plurality of sub-drives comprises:

selecting a source superblock from the one of the plurality of sub-drives;

relocating valid data from the selected source superblock only into a relocation superblock in the one of the plurality of sub-drives; and assigning the source superblock to a shared free block pool for the non-volatile memory system after relocating the valid data.

3. The method of claim 1, wherein measuring the host write workload comprises:

detecting a garbage collection trigger; and in response to detecting the garbage collection trigger determining a percentage of host writes sent to each of the plurality of sub-drives for a predetermined window of time.

4. The method of claim 3, wherein altering the amount of overprovisioning of the one of the plurality of sub-drives based on the minimum amount of overprovisioning associated with the respective tenant of the sub-drive and the change in the measured host write workload of another of the plurality of sub-drives comprises:

for each respective sub-drive, determining a target overprovisioning amount based on the determined percentage of host writes sent to the respective sub-drive, the minimum amount of overprovisioning associated with the respective tenant, and a percentage of a total valid logical space of the memory system in the respective sub-drive; and performing a garbage collection operation in a selected sub-drive of the plurality of sub-drives, wherein the selected sub-drive comprises a sub-drive having a greatest amount of actual overprovisioning above the target overprovisioning amount determined for that sub-drive.

5. The method of claim 4, wherein performing the garbage collection operation comprises:

relocating valid data from a selected source superblock in the selected sub-drive only into a relocation superblock in the selected sub-drive; and assigning the source superblock to a shared free block pool for the non-volatile memory system after relocating the valid data.

6. The method of claim 5, further comprising selecting a superblock having a least amount of valid data in the selected sub-drive as the selected source superblock.

7. The method of claim 3, wherein altering the amount of overprovisioning of the one of the plurality of sub-drives based on the minimum amount of overprovisioning associated with the respective tenant of the sub-drive and the change in the measured host write workload of another of the plurality of sub-drives comprises:

for each respective sub-drive of the plurality of sub-drives determining a target overprovisioning amount based on the determined percentage of host writes sent to the respective sub-drive, and based on a percentage of a total valid logical space of the memory system in the respective sub-drive; and performing a garbage collection operation in a selected sub-drive of the plurality of sub-drives, wherein the selected sub-drive comprises a sub-drive having a greatest amount of actual overprovisioning above a greater of the target overprovisioning amount determined for that sub-drive or any predetermined minimum overprovisioning associated with the sub-drive.

8. The method of claim 1, further comprising the controller storing a recent current workload calculation for the one for the plurality of sub-drives when the one of the plurality of sub-drives becomes idle.

9. The method of claim 8, further comprises the controller:

retrieving the recent current workload calculation for the one for the plurality of sub-drives, when the one of the plurality of sub-drives becomes active after being idle; and applying the recent current workload calculation as a current workload calculation to a new overprovisioning determination for all of the plurality of sub-drives.

10. A non-volatile memory system for managing data from a plurality of hosts, the system comprising:

a non-volatile memory having a plurality of sub-drives; and a controller in communication with the plurality of sub-drives, the controller configured to:

receive host data writes of a plurality of data streams from the plurality of hosts, wherein each of the plurality of data streams is associated with a respective tenant, each respective tenant corresponding to a host system of a different remotely located subscriber, wherein each tenant is associated with a minimum amount of overprovisioning;

maintain data from each of the plurality of data streams in a different respective separate sub-drive, the different respective separate sub-drive being only utilizable for the respective tenant, each of the plurality of data streams being separately identifiable based at least in part on identification information that is included with each stream write from the respective tenant;

measure a host write workload of each of the plurality of sub-drives;

determine a respective target overprovisioning level for each of the plurality of sub-drives based on a relative host write workload of each of the plurality of sub-drives; and adjust an overprovisioning of one of the plurality of sub-drives in accordance with the respective target overprovisioning level determined for the one of the plurality of sub-drives and the minimum amount of overprovisioning associated with the respective tenant of the sub-drive.

11. The non-volatile memory system of claim 10, wherein the non-volatile memory comprises a substrate formed with a three-dimensional memory structure.

12. The non-volatile memory system of claim 10, wherein to adjust the overprovisioning, the controller is configured to perform a garbage collection operation on the one of the plurality of sub-drives.

13. The non-volatile memory system of claim 12, wherein to perform a garbage collection operation to adjust the overprovisioning, the controller is configured to:

select a source superblock from the one of the plurality of sub-drives;

relocate valid data from the selected source superblock only into a relocation superblock in the one of the plurality of sub-drives; and after relocating the valid data from the selected source superblock, assign the source superblock to a shared free block pool for the non-volatile memory system.

14. The non-volatile memory system of claim 10, wherein to measure the host write workload the controller is further configured to:

detect a garbage collection trigger; and in response to detecting the garbage collection trigger, determine a current workload of an amount of host writes for a predetermined window of time for each of the plurality of sub-drives.

15. The non-volatile memory system of claim 10, wherein the controller is configured to, in response to one of the plurality of sub-drives becoming idle, store a recent current workload calculation for the one for the plurality of sub-drives.

16. The non-volatile memory system of claim 15, wherein the controller is configured to:

retrieve the recent current workload calculation stored for the one for the plurality of sub-drives when the one of the plurality of sub-drives becomes active after being idle; and apply the recent current workload calculation as a current workload calculation to a new overprovisioning determination for all of the plurality of sub-drives.

17. The non-volatile memory system of claim 10, wherein the controller is configured to determine the respective target overprovisioning level for each of the plurality of sub-drives based on a percentage of host writes sent to each respective sub-drive, and based on a percentage of a total valid logical space of the non-volatile memory system assigned to the respective sub-drive; and wherein to adjust the overprovisioning of one of the plurality of sub-drives, the controller is configured to:
    select a sub-drive having a greatest amount of actual overprovisioning above the respective target overprovisioning level determined for that sub-drive; and
    perform a garbage collection operation on the selected sub-drive.

18. The non-volatile memory system of claim 17, wherein the controller is configured to determine the respective target overprovisioning level for each of the plurality of sub-drives according to a relation:

$$\theta_i = \sqrt{\frac{\alpha_i \cdot v_i}{\left(\sum_i \sqrt{\alpha_i \cdot v_i}\right)^2}}$$

where for each sub-drive i, $\theta_i$ is a fraction (0 to 1) of target overprovisioning that should be applied to sub-drive i; $\alpha_i$ is a fraction (0 to 1) of total amount of valid logical space of the non-volatile memory system in sub-drive i; and $v_i$ is a fraction (0 to 1) of total host write workload attributed to sub-drive i.

19. A non-volatile memory system for managing data from a plurality of hosts, the system comprising:
    a non-volatile memory having a plurality of sub-drives;
    means for receiving host data writes of a plurality of different data streams from a plurality of host sources at the memory system and for storing all received host writes for each particular different data stream only in a respective one of the plurality of sub-drives, wherein each of the plurality of different data streams is associated with a respective tenant, each respective tenant corresponding to a host system of a different remotely located subscriber, the respective one of the plurality of sub-drives being only utilizable for the respective tenant, each of the plurality of different data streams being separately identifiable based at least in part on identification information that is included with each stream write from the respective tenant, wherein each tenant is associated with a minimum amount of overprovisioning;
    means for measuring a host write workload of each of the plurality of sub-drives; and
    means for altering an amount of overprovisioning of one of the plurality of sub-drives based on the minimum amount of overprovisioning associated with the respective tenant of the sub-drive and a change in the measured host write workload of another of the plurality of sub-drives.

20. The non-volatile memory system of claim 19, wherein the means for altering the amount of overprovisioning comprises:
    means for determining a target overprovisioning amount in a particular sub-drive based on a determined percentage of host writes sent to the particular sub-drive, the minimum amount of overprovisioning associated with the respective tenant, and on a percentage of a total valid logical space of the memory system in the particular sub-drive; and
    means for performing a garbage collection operation in a selected sub-drive of the plurality of sub-drives, wherein the selected sub-drive comprises a sub-drive having a greatest amount of actual overprovisioning above the target overprovisioning amount determined for that sub-drive.

\* \* \* \* \*